No. 860,894. PATENTED JULY 23, 1907.
R. C. BELK.
REVERSIBLE DISK PLOW.
APPLICATION FILED MAR. 7, 1907.
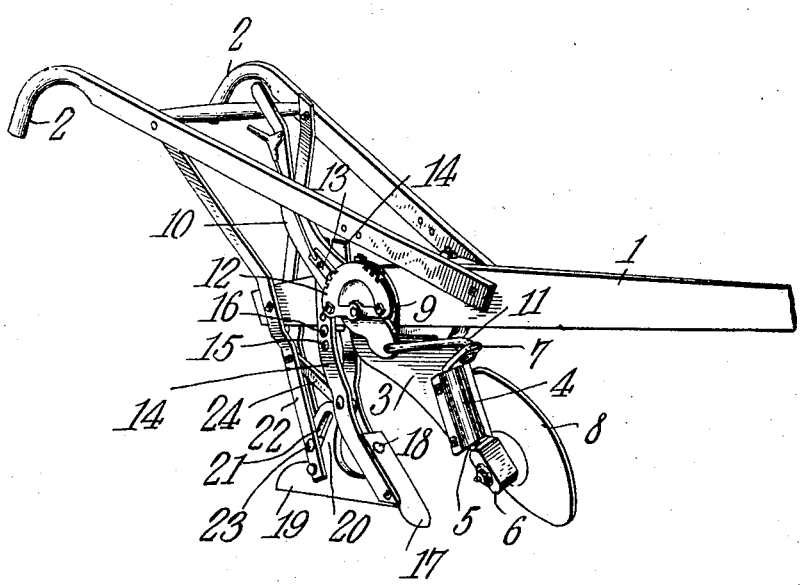
WITNESSES:
Robert C. Belk,
INVENTOR.
By C. A. Snow & Co.
ATTORNEYS

UNITED STATES PATENT OFFICE.

ROBERT C. BELK, OF MOUNT HOLLY, NORTH CAROLINA.

REVERSIBLE-DISK PLOW.

No. 860,894.      Specification of Letters Patent.      Patented July 23, 1907.

Application filed March 7, 1907. Serial No. 361,124.

*To all whom it may concern:*

Be it known that I, ROBERT C. BELK, a citizen of the United States, residing at Mount Holly, in the county of Gaston and State of North Carolina, have invented a new and useful Reversible-Disk Plow, of which the following is a specification.

This invention has relation to reversible disk plows and it consists in the novel construction and arrangement of its parts as hereinafter shown and described.

The object of the invention is to provide a reversible disk plow which may be used for shallow or deep tilling and which may be manipulated to throw the soil to one side or the other as desired. Means is also provided for regulating the depth at which the disk will operate in the ground and the said disk mechanism may be easily and readily removed from the plow when the same may be used in the usual capacity as a land side plow. The parts are put together in such manner as not to weaken the beam and may be easily and readily adjusted to meet various conditions or for the different intended purposes.

In the accompanying drawing:—the figure is a perspective view of the plow.

The plow consists of the beam 1 to which is attached the handles 2. The plate 3 depends from the beam 1 and is suitably bolted to the same. The said plate is provided at its forward edge with a bearing 4 in which is journaled a shaft 5, said shaft having at its lower end a head 6 and at its upper end a crank arm 7. The disk 8 is journaled to the head 6. Said disk may be of large or small size according to the size of the furrow intended to be opened. The plate 3 is provided at its upper edge with a portion 9 which bears against the side of the beam 1. The lever 10 is fulcrumed to the portion 9 and the working end of said lever is connected by means of a link 11 with the crank 7 of the shaft 5. The gear segment 12 is mounted upon the portion 9 and the spring actuated pawl 13 mounted upon the lever 10 engages the gear teeth of the said segment 12.

From the foregoing description it is obvious that by shifting the lever 10 upon its fulcrum point that the disk 8 may be turned to any desired angle with relation to the line of draft of the implement and that the said shaft 5 may be turned in the bearing 4 so as to bring the disk 8 upon either side of the said bearing whereby the disk will throw the soil to one side or the other of the implement.

The standards 14 are provided at their upper portion, each with a series of perforations 15 which are adapted to receive the transversely extending bolts 16 which in turn are located, one above and the other below the beam 1. The upper portions of the standards 14 lie flat against the sides of the beam 1. Thus it will be seen that means is provided for adjustably attaching the said standards to the beams. The plow point 17 is adjustably attached to the lower portions of the standards 14 by means of the heel bolt 18. The foot 19 is pivoted at its forward end between the lower ends of the standards 14. Said foot 19 is provided with the upwardly disposed portion 20 which in turn is provided with an arcuate slot 21. The standards 22 are fixed at their upper ends to the handles 2 and at intermediate points to the rear end of the beam 1 and at their lower ends are connected together by means of a bolt 23 which lies in the arcuate slot 21 of the portion 20 of the plow foot. The brace 24 is pivoted at its rear end between the standards 22 and at its forward ends between the standards 14. Thus it will be seen that by loosening the nut upon the bolt 23 that the plow foot 19 may be swung upon its pivotal connection with the standards 14 and when adjusted to proper position may be secured in such adjusted position by tightening the nut upon the said bolt. Also the point 17 may be adjusted longitudinally along the standards 14 and the said standards themselves may be adjusted vertically with relation to the beam 1. Thus a variety of adjustments is provided and the foot 19 may be adjusted to govern the depth at which the disk 8 will cut in the soil. Also the plate 3 and its attachments may be readily removed from the beam 1 when the implement may be used as a land side plow instead of a disk plow.

It will be observed that the bearing for the shaft 5 is not directly attached to the beam 1 nor does it pass transversely through the same, consequently, the said beam is not unnecessarily weakened. It will also be observed that all of the parts for manipulating and adjusting the disk 8 are attached directly to the plate 3, consequently, all of such parts are removed from the beam 1 when the said plate is removed therefrom.

It will be noted that the standards 22 lap the faces of the foot 19 and serve to brace the same against lateral pressure. The pivot of the foot is therefore relieved of strain. It will also be noted that the arcuate slot 21 is formed within an upwardly disposed portion 20 which is integral with the foot. The number of parts necessary to construct the device is therefore reduced. As the slot 21 is concentric with the pivot of the foot 19 the above construction is permissible. Another point of advantage in the present construction is the fact that the foot or shoe 19 serves to regulate the depth of the point 17 and of the reversible disk 8.

Having described my invention what I claim as new and desire to secure by Letters Patent is:—

1. A plow comprising a beam, handles extending therefrom, rear standards secured at their upper ends to the handles and at intermediate points upon opposite faces of the beam, the lower portions of said standards being parallel, standards secured upon opposite faces of the beam and in front of the first mentioned standards, a brace connecting the front and rear standards, a plow point secured upon and adjustable longitudinally of the front standards, a plow foot pivotally connected to the front standards and having an integral projecting portion formed with an arcuate slot concentric with the pivot of the foot, said foot being interposed and designed to swing between the rear standards, a clamping bolt connecting the rear standards and projecting through the arcuate slot, said bolt being disposed to clamp the standards upon the foot to lock it in adjusted position, and a reversible disk movably connected to the beam, said foot constituting means to regulate the depth of the cut of the plow point and disk.

2. In a plow the combination with a beam; of front, rear, and intermediate hangers depending from the beam, a reversible disk carried by the front hanger, a plow point carried by the intermediate hangers, a foot pivotally connected to the intermediate hangers and mounted to swing between the rear hangers, said foot being disposed to regulate the depth of the plow point and disk and having an integral slotted extension, and means for clamping the rear standards upon the foot and extension to hold said foot in adjusted position.

In testimony that I claim the foregoing as my own, I have hereto affixed my signature in the presence of two witnesses.

ROBERT C. BELK.

Witnesses:
 W. F. HOLLAND,
 GEO. D. JENKINS.